United States Patent
Drum et al.

(10) Patent No.: US 7,801,124 B2
(45) Date of Patent: Sep. 21, 2010

(54) METHODS, SYSTEMS, AND COMPUTER PROGRAM PRODUCTS FOR DETERMINING THE APPLICATION-LEVEL PROTOCOL OF A SIGNALING MESSAGE

(75) Inventors: Michael J. Drum, Cary, NC (US); Cynthia A. Whitmire, Garner, NC (US)

(73) Assignee: Tekelec, Morrisvillle, NC (US)

( * ) Notice: Subject to any disclaimer, the term of this patent is extended or adjusted under 35 U.S.C. 154(b) by 1526 days.

(21) Appl. No.: 11/084,696

(22) Filed: Mar. 18, 2005

(65) Prior Publication Data

US 2005/0207434 A1   Sep. 22, 2005

Related U.S. Application Data

(60) Provisional application No. 60/554,280, filed on Mar. 18, 2004.

(51) Int. Cl.
*H04L 12/28* (2006.01)
*H04L 12/56* (2006.01)
*H04J 3/16* (2006.01)
*H04J 3/12* (2006.01)
*G06F 15/16* (2006.01)

(52) U.S. Cl. .................. 370/389; 370/392; 370/410; 370/467; 370/469; 370/471; 370/522; 709/228

(58) Field of Classification Search .................. None
See application file for complete search history.

(56) References Cited

U.S. PATENT DOCUMENTS

| | | | |
|---|---|---|---|
| 5,377,186 A | 12/1994 | Wegner et al. | |
| 5,818,919 A | 10/1998 | Berberich, Jr. et al. | |
| 5,991,375 A | 11/1999 | Stahl et al. | |
| 6,011,803 A | 1/2000 | Bicknell et al. | |
| 6,111,893 A | 8/2000 | Volfsun et al. | |

(Continued)

FOREIGN PATENT DOCUMENTS

| EP | 0 805 606 A2 | 11/1997 |
|---|---|---|
| WO | WO 00/39969 | 7/2000 |
| WO | WO 02/21857 A1 | 3/2002 |
| WO | WO 2005/013538 | 2/2005 |

OTHER PUBLICATIONS

Supplementary Partial European Search Report for Application No. 02739683.7 (Sep. 24, 2007).

(Continued)

*Primary Examiner*—Seema S Rao
*Assistant Examiner*—Christine Duong
(74) *Attorney, Agent, or Firm*—Jenkins, Wilson, Taylor & Hunt, P.A.

(57) ABSTRACT

Method, systems, and computer program products for identifying the application-level protocol of a signaling message are disclosed. According to one method, a message copied by a network monitoring system is received. The service indicator in the message is examined to determine whether more than one application-level protocol is possible. If more than one application-level protocol is not possible, the application-level protocol is identified based on the service indicator. If more than one application-level protocol is possible, additional message attributes are individually examined to determine whether identification of the application-level protocol is possible based on each attribute. The application-level protocol is identified based on the first attribute for which identification is determined to be possible.

36 Claims, 6 Drawing Sheets

U.S. PATENT DOCUMENTS

| | | | |
|---|---|---|---|
| 6,324,183 | B1 | 11/2001 | Miller et al. |
| 6,363,065 | B1 | 3/2002 | Thornton et al. |
| 6,426,944 | B1 | 7/2002 | Moore |
| 6,577,723 | B1 * | 6/2003 | Mooney ................ 379/221.08 |
| 6,674,744 | B1 | 1/2004 | Doshi et al. |
| 6,724,752 | B1 | 4/2004 | Turtianinen et al. |
| 6,741,610 | B1 | 5/2004 | Volftsun et al. |
| 6,831,898 | B1 | 12/2004 | Edsall et al. |
| 6,842,447 | B1 | 1/2005 | Cannon |
| 6,967,956 | B1 | 11/2005 | Tinsley et al. |
| 6,990,124 | B1 | 1/2006 | Dalias et al. |
| 7,085,279 | B1 | 8/2006 | Kumar et al. |
| 7,227,927 | B1 | 6/2007 | Benedyk et al. |
| 7,295,579 | B2 | 11/2007 | Sprague et al. |
| 7,580,517 | B2 | 8/2009 | Khadri et al. |
| 2002/0126653 | A1 * | 9/2002 | Vasarainen .................. 370/352 |
| 2003/0053473 | A1 * | 3/2003 | Kung et al. .................. 370/422 |
| 2003/0099192 | A1 | 5/2003 | Scott et al. |
| 2004/0052240 | A1 * | 3/2004 | Stahl et al. .................. 370/351 |
| 2004/0081206 | A1 | 4/2004 | Allison et al. |
| 2005/0207434 | A1 | 9/2005 | Drum et al. |

OTHER PUBLICATIONS

Notice of Allowance and Fee(s) Due for U.S. Appl. No. 10/164,226 (Sep. 6, 2007).

Official Action for U.S. Appl. No. 10/164,226 (Feb. 28, 2007).

Official Action for U.S. Appl. No. 10/164,226 (Aug. 22, 2006).

PNO-ISC Specification No. 0007—ISDN User Part (ISUP), ND1007:2006/04, pp. 1-198 (Apr. 2006).

International Search Report for International Application No. PCT/US02/17726 (Dec. 12, 2002).

Sprague et al., "Tekelec's Transport Adapter Layer Interface," Network Working Group, RFC 3094, pp. 1-106.

"ISUP Normalization in the IP7 SG," Tekelec, p. 1-60 (Copyright 2000).

"Signalling System No. 7—ISDN User Part Functional Description," ITU-T, Q.764 (Dec. 1999).

"Signalling System No. 7—ISDN User Part Functional Description," ITU-T, Q.763 (Dec. 1999).

"Signalling System No. 7—ISDN User Part Functional Description," ITU-T, Q.762 (Dec. 1999).

"Signalling System No. 7—ISDN User Part Functional Description," ITU-T, Q.761 (Dec. 1999).

Lakshmi-Ratan, "The Lucent Technologies Softswitch-Realizing the Promise of Convergence," Bell Labs Technical Journal, pp. 174-195 (Apr.-Jun. 1999).

"Integrated Services Digital Network (ISDN); Signalling System No. 7; ISDN User Part (ISUP) Version 3 for the International Interface; Part 15: Diversion Supplementary Service," EN 300 356-15 V3.2.2 (Aug. 1998).

Tekelec, "Eagle® Feature Guide," PN/9110-1225-01, (Jan. 1998).

Bellcore, Bell Communications Research Specification of Signalling System No. 7, vol. 3, Issue 1, pp. 440 (Dec. 1994).

* cited by examiner

METHODS, SYSTEMS, AND COMPUTER PROGRAM PRODUCTS FOR DETERMINING THE APPLICATION-LEVEL PROTOCOL OF A SIGNALING MESSAGE

RELATED APPLICATIONS

This application claims the benefit of U.S. Provisional Patent Application Ser. No. 60/554,280, filed Mar. 18, 2004; the disclosure of which is incorporated herein by reference in its entirety.

REFERENCE TO COMPUTER PROGRAM LISTING APPENDIX ON CD-R

A computer program listing is being submitted herewith as an 18 KB file on CD-R (in duplicate). Each CD-R is marked in indelible ink to identify the Inventors, Title, File Names (protolyzer.txt), Creation Date (Mar. 18, 2005), Computer System (IBM-PC/MS-DOS/MS-Windows). The computer program listing submitted on CD-R is hereby incorporated by reference herein in its entirety.

COPYRIGHT NOTICE

The portion of this disclosure appearing on the enclosed CD-Rs is subject to copyright protection. The copyright owner has no objection to the facsimile reproduction by anyone of the patent disclosure as it appears in the Patent and Trademark Office files or records, but otherwise reserves all copyrights whatsoever.

TECHNICAL FIELD

The subject matter described herein relates to analyzing signaling messages in a communications network. More particularly, the subject matter described herein relates to methods, systems, and computer program products for determining the application-level protocol of a signaling message based on the values of non-application-level and application-level message parameters.

BACKGROUND ART

For certain network monitoring applications, it may be desirable to determine the application protocol of a signaling message, such as an SS7 message signaling unit (MSU). Using application protocols carried by SS7 MSUs as an example, it may be desirable to determine whether an MSU carries line information database (LIDB) or calling name (CNAM) application-level protocols for billing or usage measurements purposes.

Traditionally, in SS7 networks, the subsystem number (SSN) in the signaling connection control part (SCCP) layer of an MSU has been used to determine the application-level protocol of the MSU. The SSN may uniquely indicate an application-level protocol. Some application-level protocols, however, have begun re-using subsystem numbers. That is, different protocols may use the same SSN value. In addition, different service providers may use different SSN values to indicate the same application-level protocol. Thus, the SSN alone cannot always be used to identify the application-level protocol in a message.

Another message parameter that has been used in identifying the application-level protocol is the translation type (TT). However, like the SSN, application-level protocols are also re-using translation types. This trend of reusing SSN and TT identifiers is likely to continue as new protocols are developed.

One conventional solution to the re-use of TT and SSN values is to use point codes to identify the application-level protocol of a message. For example, a network monitoring system may be statically provisioned with mappings between point codes of nodes and application-level protocols of the nodes so that messages addressed to (in the case of query messages) or from (in the case of response or return error messages) a particular node can be identified based on the destination, as well as the TT and SSN values. While this solution is capable of identifying the correct application-level protocol, provisioning becomes cumbersome as the number of nodes in the network being monitored increases. In addition, using the point code to identify the application-level protocol fails when a node with a single point code supports multiple different application-level protocols.

Accordingly, there is a need for improved methods, systems, and computer program products for identifying the application-level protocol of a message.

DISCLOSURE

In accordance with one aspect of the subject matter described herein, a method of determining an application protocol of a signaling system 7 (SS7) message signaling unit (MSU) is provided. As used herein, the terms "application protocol" and "application-level protocol" refer to the protocol used by the terminating application to which signaling messages are directed. In SS7 networks, examples of application protocols include LIDB, CNAM, N00, INAP, IS-41, GSM, BSSAP, DTAP, etc.

In one implementation for identifying the application-level protocol of an SS7 MSU, the service indicator (SI) of the MSU is examined. Next, it is determined, based on the service indicator, whether more than one application-level protocol is possible. If the service indicator indicates that more than one application-level protocol is possible, the method may include individually examining additional attributes of the signaling message and determining whether the application-level protocol can be identified based on the attribute. For each attribute, if the application-level protocol can be identified, then it is identified. If the application-level protocol cannot be identified, the next attribute is examined. The process is repeated until the application-level protocol is identified or until it is determined that the application-level protocol cannot be identified. By examining message attributes in addition to the SI, the subject matter described herein increases the likelihood that the application-level protocol will be correctly identified over conventional methods that rely solely on the SI. By using a process where attributes or groups of attributes are individually tested to determine whether the application-level protocol can be identified, the subject matter described herein provides an efficient mechanism for identifying the application-level protocol of a signaling message.

Once the application-level protocol is identified, a message decode template may be selected based on the identified application-level protocol type. If the message decodes correctly, the message may be displayed to the user via a protocol analysis user interface.

If it is not possible to identify the application-level protocol of the message using the method described above, the method may include reverting to identifying the application-level protocol of the message based on point code, TT, and SSN. For query messages, the application-level protocol may be identified by comparing the called party point code to a list of provisioned point codes. For response messages, the application-level protocol may be identified based on the MTP originating point code.

Attempting to identify the application-level protocol of the message using the steps described above may include determining that the message does not have an application-level protocol. This may be the case for TCAP return error messages. TCAP return error messages may be identified by a null or zero length parameter set. Such messages may be decoded using a standard TCAP decode template.

The subject matter described herein for identifying the application-level protocol of a message may be implemented using a computer program product comprising computer executable instructions embodied in a computer readable medium. Exemplary computer readable media suitable for implementing the steps described herein for identifying the application-level protocol of a signaling message include chip memory devices, disk memory devices, programmable logic devices, and application specific integrated circuits.

BRIEF DESCRIPTION OF THE DRAWINGS

Preferred embodiments of the subject matter described herein will now be explained with reference to the accompanying drawings of which.

DETAILED DESCRIPTION

Figure 1:
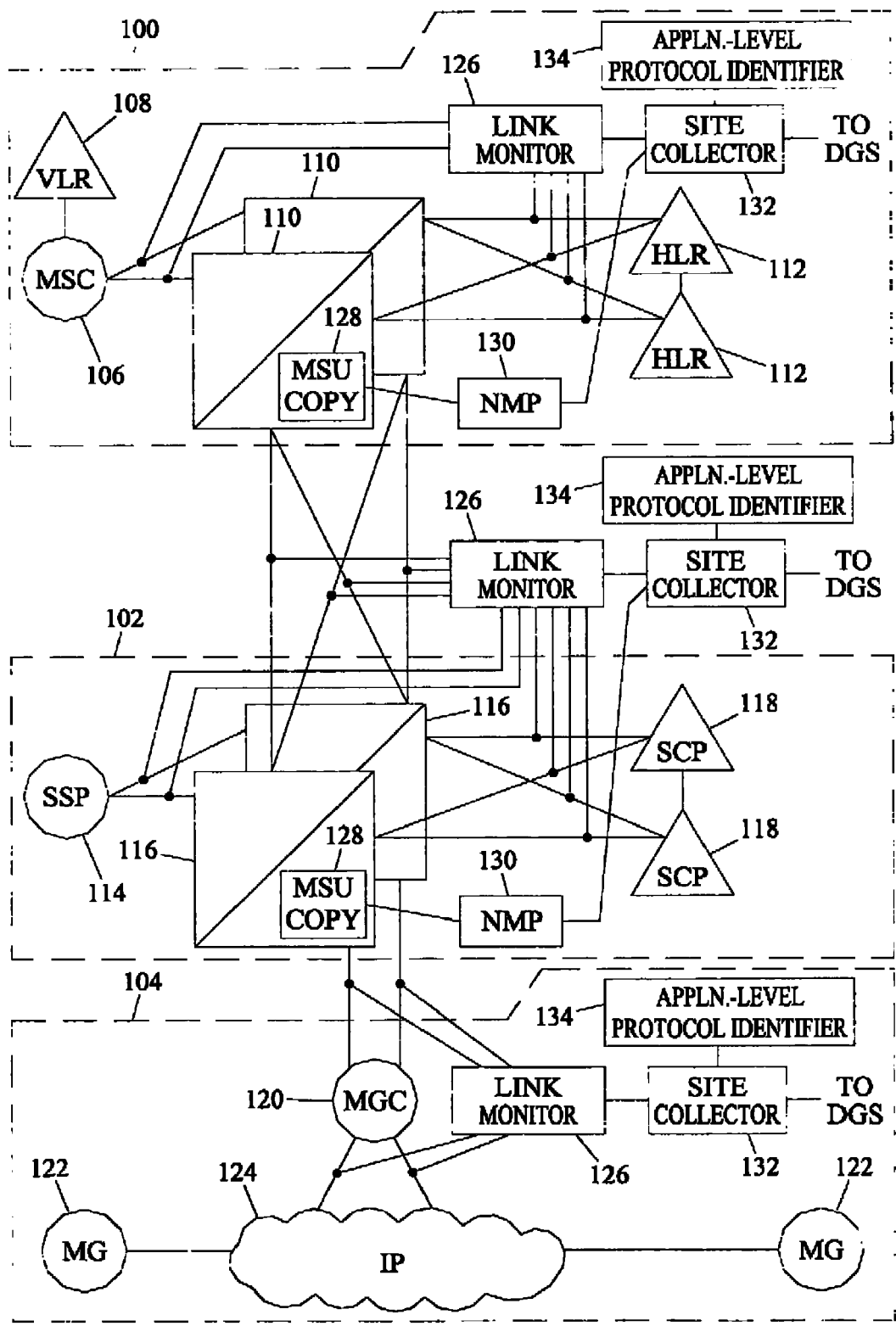
FIG. 1 is a network diagram of an exemplary operating environment for the methods and systems for determining the application-level protocol of a signaling message according to an embodiment of the subject matter described herein.

As stated above, the subject matter described herein includes methods systems, and computer program products for identifying the application-level protocol of signaling messages for network monitoring purposes. FIG. 1 illustrates an exemplary telecommunications signaling network and the associated network monitoring platforms for collecting signaling messages. Referring to FIG. 1, the network includes a wireless component 100 for generating and routing signaling messages associated with wireless telecommunications, a wireline component 102 for generating and routing signaling messages associated with wireline communications, and an IP telephony component 104 for generating and routing signaling messages associated with IP telephony communications. Wireless component 100 includes a mobile switching center (MSC) 106, a visitor location register (VLR) 108, a signal transfer point (STP) pair 110, and a home location register (HLR) pair 112. MSC 106 originates and terminates calls to and from mobile subscribers. VLR 108 is a database that stores information regarding subscribers roaming in a particular network. STPs 110 route signaling messages between other network entities. HLRs 112 store subscriber records and subscriber location information.

Wireline component 102 includes a service switching point (SSP) 114, an STP pair 116, and a service control point (SCP) pair 118. SSP 114 originates and terminates calls to and from wireline subscribers. STP pair 116 routes signaling messages between other network entities. SCP pair 118 provides application-level database services, such as LIDB, CNAM, and N00 service. Since these protocols may be of interest for network monitoring, usage measurements, and billing purpose, the methods and systems of the present invention are preferably capable of identifying these and other application-level protocols.

IP telephony component 104 includes a media gateway controller 120 and media gateways 122. Media gateway controller 120 controls media gateways 122 to set up calls between end users via IP network 124. Media gateways 122 handle media stream communications between end users.

The network illustrated in FIG. 1 also includes a plurality of link monitors 126 for copying SS7 signaling messages. Link monitors 126 may include link probes that connect to external signaling links that interconnect network elements. For example, if a link monitor 126 is co-located with a STP pair, link monitor 126 may be connected to signaling links terminated by the STP pair. Exemplary commercially available link monitors suitable for use with embodiments of the present invention are the i2000 and i3000 shelves available from Tekelec of Calabasas, Calif. Briefly, these link monitors include external link probes that non-intrusively copy signaling messages from signaling links. The link monitors connect to a shelf. The shelf is a computing platform that includes a plurality of link interface controllers that interface directly with the link probes. The shelf also includes link interface modules that run various link monitoring and traffic simulation applications.

In addition to external link monitors 126, internal link monitors 128 and associated network monitoring processors 130 may be used to copy signaling messages from within network nodes, such as STPs. An example of a probeless network monitoring system is described in commonly assigned, co-pending U.S. patent application Ser. No. 10/164, 226, filed Jun. 5, 2002, the disclosure of which is incorporated herein by referencing its entirety. Briefly, this network monitoring system includes message copy functions located on link interface cards within a signal transfer point. The signal transfer point also includes a network monitoring transport card that transports messages copied from signaling links to network monitoring processors 130 located external to the signal transfer point. Network monitoring processors 130 store copied signaling messages and forward the signaling messages to downstream network monitoring applications.

A plurality of site collectors 132 collects signaling messages copied by both internal and external link monitors. In the illustrated example, each site collector 132 includes an application-level protocol identifier 134 according to an embodiment of the present invention. Each application-level protocol identifier 134 examines non-application-level parameters, national variant, and application-level parameters to determine the application protocol of received signaling messages.

Figure 2:
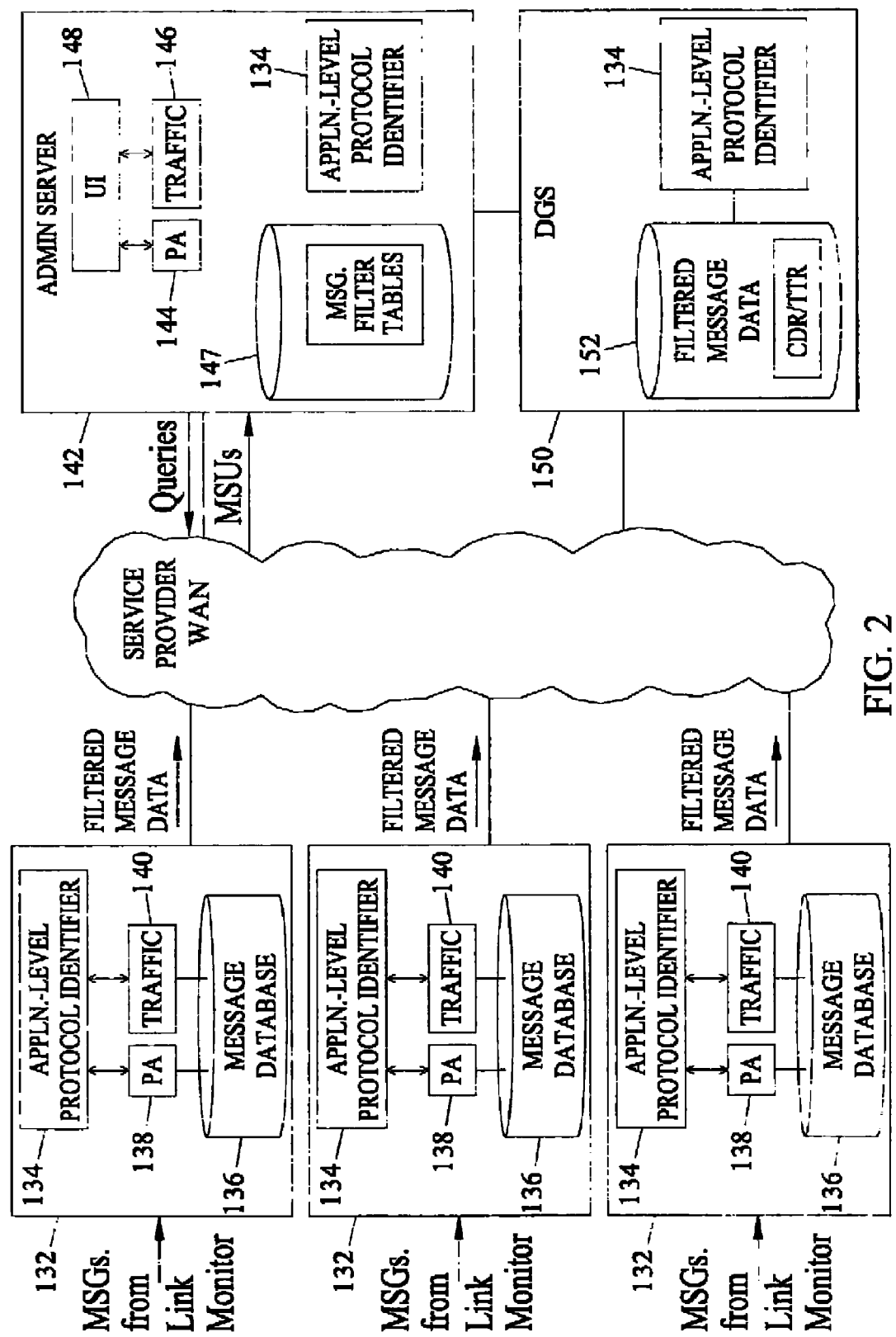
FIG. 2 is a block diagram illustrating an exemplary network monitoring system including an application-level protocol identifier according to an embodiment of the subject matter described herein.

FIG. 2 is a block diagram illustrating site collectors 132 and application-level protocol identifiers 134 in more detail. Referring to FIG. 2, each site collector 132 receives signaling messages copied from its associated link monitor or link monitors. Each site collector 132 stores the signaling messages in a message database 136. Network monitoring applications, such as protocol analysis application 138 and traffic application 140, perform various network monitoring functions based on the signaling messages stored in the database.

For example, protocol analysis application 138 may send signaling messages stored in database 136 to administration server 142 where a server-based protocol analysis component 144 decodes the messages and presents the messages to a user in a convenient format, such as text format. Traffic application 140 may count the number of occurrences of messages matching user-defined criteria and send the counts to administration server 142 where server-based traffic component 146 displays the counts to the user.

According to one aspect of the subject matter described herein, protocol analysis application 138 and traffic application 140 may invoke application-level protocol identifier 134 to determine the application-level protocol of each received signaling message. Application-level protocol identifier 134 may be a stand-alone application that receives messages from other applications and returns the application protocol of the message. In one implementation, application-level protocol identifier may be a library that is statically or dynamically linked into other applications, such as protocol analysis application 138 or traffic application 140.

The network monitoring functions performed by applications 138 and 140 may be controlled by an administration server 142. For example, administration server 142 may include a database 147 that stores message filter tables and a user interface 148 that allows a user to remotely invoke protocol analysis and traffic analysis applications on site collectors 132. For example, server-based protocol analysis and traffic components 144 and 146 may be used to invoke site-collector-based components 138 and 140, based on parameters input by a user via user interface 148. In order to invoke one of the applications, a user may send a query to all site collectors 132 requesting application-level signaling message data over a certain time period. Application-level protocol identifiers 134 on site collectors 132 may examine messages in databases 136, identify the application protocol and send the messages and an application protocol identifier to administration server 142 or to a data gateway server 150. Data gateway server 150 stores filtered messages in a database 152. Database 152 may store raw MSUs, call detail records (CDRs), transaction detail records (TDRs), and peg counts. As illustrated in FIG. 2, both administration server 142 and data gateway server 152 may have application-level protocol identifiers 134 for analyzing messages received from site collectors 132.

As stated above, in one embodiment of the subject matter described herein, application-level protocol identifiers 134 may be implemented as libraries that can be incorporated into other network monitoring applications. Application-level protocol identifiers 134 may determine the application protocol of a message signaling unit by analyzing application-level and non-application level parameters and characteristics of a signaling message. These parameters and characteristics may include the service indicator (SI) value, the level 4 national variant, the TCAP package type identifier, and possibly other application-layer and non-application-layer parameters or characteristics. In one exemplary implementation, the parameters and characteristics are individually analyzed to determine whether the application-level protocol can be identified. If the application-level protocol cannot be identified based on one parameter, another parameter or characteristic is tested. By serially testing individual parameters or groups of parameters, the application-level protocol can be accurately and efficiently identified.

Table 1 provides an overview of several distinguishing features that application-level protocol identifiers 134 may use to differentiate between application-level protocols. It should be appreciated that the protocols listed in Table 1 are merely examples, and other protocols may be identified using similar criteria without departing from the scope of the subject matter described herein.

TABLE 1

Application Protocol Identification Information

| Protocol | TCAP Flavor | How is the protocol determined |
| --- | --- | --- |
| SIGNET | | SI = 0 |
| NET TEST | | SI = 1 or SI = 2 |
| SCCP | | SI = 3 |
| SCCP MGMT | | SI = 3 and SSN = 1 |
| ANSI TCAP | | SI = 3, TCAP message type = 0xE1-0xE6, 0xF6. The primitive/constructed bit of an ASN.1 tag (sixth bit from the right, starting with bit one) should be set and is ignored. |
| ITU TCAP | | SI = 3, TCAP message type = 0x01-0x06, 0x61, 0x62, 0x64, 0x65, 0x67 |
| N00 | ANSI | SI = 3, TCAP opcode = 0x0104 or 0x0105 or SI = 3, first parameter tag = 0xDF46 or SI = 3, first parameter tag = 0xAA and the second parameter tag = 0x84 |
| LIDB | ANSI | SI = 3, first octet of any parameter tag = 0xDF and second octet is not 0x46 (N00) or 0x81 (ANSI-41) |
| CLASS | ANSI | SI = 3, first parameter tag = 0xAA |
| CNAME | ANSI | SI = 3, first parameter tag = 0x97 |
| AIN | ANSI | SI = 3, first octet of the TCAP opcode = 0x64, 0x65, 0x66, 0x67 or 0x6A |
| ANSI 41 | ANSI | SI = 3 and SSN = 5-12 |
| INAP | ITU | SI = 3 and SSN = 241 |
| GSM MAP | ITU | SI = 3 and SSN = 5-10 |
| GSM CAMEL | ITU | SI = 3 and SSN = 146 |
| GSM BSSMAP | | SI = 3, BSS discriminator = 0 |
| GSM BSSMAP-LE | | SI = 3, BSS discriminator = 0, MT = 0x01-0x04, 0x2A-0x2E, 0x3A |
| GSM DTAP-CC | | SI = 3, BSS discriminator = 1, protocol discriminator = 0x03 |
| GSM DTAP-MM | | SI = 3, BSS discriminator = 1, protocol discriminator = 0x05 |
| GSM DTAP-RR | | SI = 3, BSS discriminator = 1, protocol discriminator = 0x06 |

TABLE 1-continued

Application Protocol Identification Information

| Protocol | TCAP Flavor | How is the protocol determined |
| --- | --- | --- |
| GSM DTAP-SMS | | SI = 3, BSS discriminator = 1, protocol discriminator = 0x09 |
| GSM DTAP-SS | | SI = 3, BSS discriminator = 1, protocol discriminator = 0x0B |
| GSM DTAP-LE | | SI = 3, BSS discriminator = 1, protocol discriminator = 0x0E |
| TUP | | SI = 4 |
| ISUP | | SI = 5 |
| BISUP | | SI = 9 |
| SISUP | | SI = 10 |
| BICC | | SI = 13 |

As indicated in Table 1, multiple application-level and non-application-level parameters may be used to identify the application protocol of a message. For example, different types of ISUP messages may be identified using SI alone. For SCCP messages, various parameters in addition to the SI may be used. For example, application-level protocol identifiers 134 may analyze mandatory parameter fields of the SCCP portion of a message. Application-level protocol identifiers 134 may also analyze the transaction capabilities application part (TCAP) of the message to determine which national variant (e.g., ANSI or ITU) of the TCAP is being used.

In one embodiment of the subject matter described herein, the application protocol is determined by first checking the SI. If the SI indicates that the message is an SCCP message, then the national variant (i.e., ANSI or ITU) is determined from the TCAP portion of the message. If the TCAP national variant is ANSI, the process may check the SSN, TCAP operation code, and/or the first octet of the TCAP parameter field to determine the application protocol. If the TCAP national variant is ITU, the application protocol may be determined based on the SSN and/or base station subsystem application part (BSSAP) discriminator.

If the message is identified as SCCP but the application-level message protocol cannot be identified based on the above criteria, application-level protocol identifiers 134 may fall back to determine the protocol based on the SSN, TT, and point code. For example, TT and SSN values may be used to identify certain application protocols, such as LIDB and CNAM. If the TT and SSN values are re-used by multiple protocols, for a TCAP response message, the origination point code in the message may be compared to a table of provisioned point codes to determine the application protocol of the node that originated the TCAP response message. For a TCAP query message with re-used TT or SSN values, the fall-back method may include comparing the called party point code in the SCCP portion of the message to the table of provisioned point codes to identify the destination node. The application-level protocol may then be identified based on the destination node. This fall-back method avoids the duplicate SSN and TT problems discussed above but can be labor intensive at provisioning time when the number of nodes in a network being monitored is large.

Some messages, such as TCAP return error messages, may not have an application-level protocol parameter. However, the messages may be associated with a query message that has an application level protocol, such as CNAM or LIDB. TCAP return error messages may be identified by a null or zero-length TCAP parameter set. Such messages may be decoded using a default message decode template, such as an ANSI TCAP template. In an alternate implementation, the application-level protocol associated with TCAP return messages may be identified by keeping track of the protocol and transaction IDs of TCAP messages until the TCAP transactions are complete. When a return error message is received, the transaction ID may be matched to an open transaction, and the protocol may be identified based on the protocol identified for the open transaction. In an alternate implementation, the application-level protocol with which a TCAP return error message is associated may be determined by comparing the originating point code in the message to a table of point codes and corresponding application types.

Figure 3:
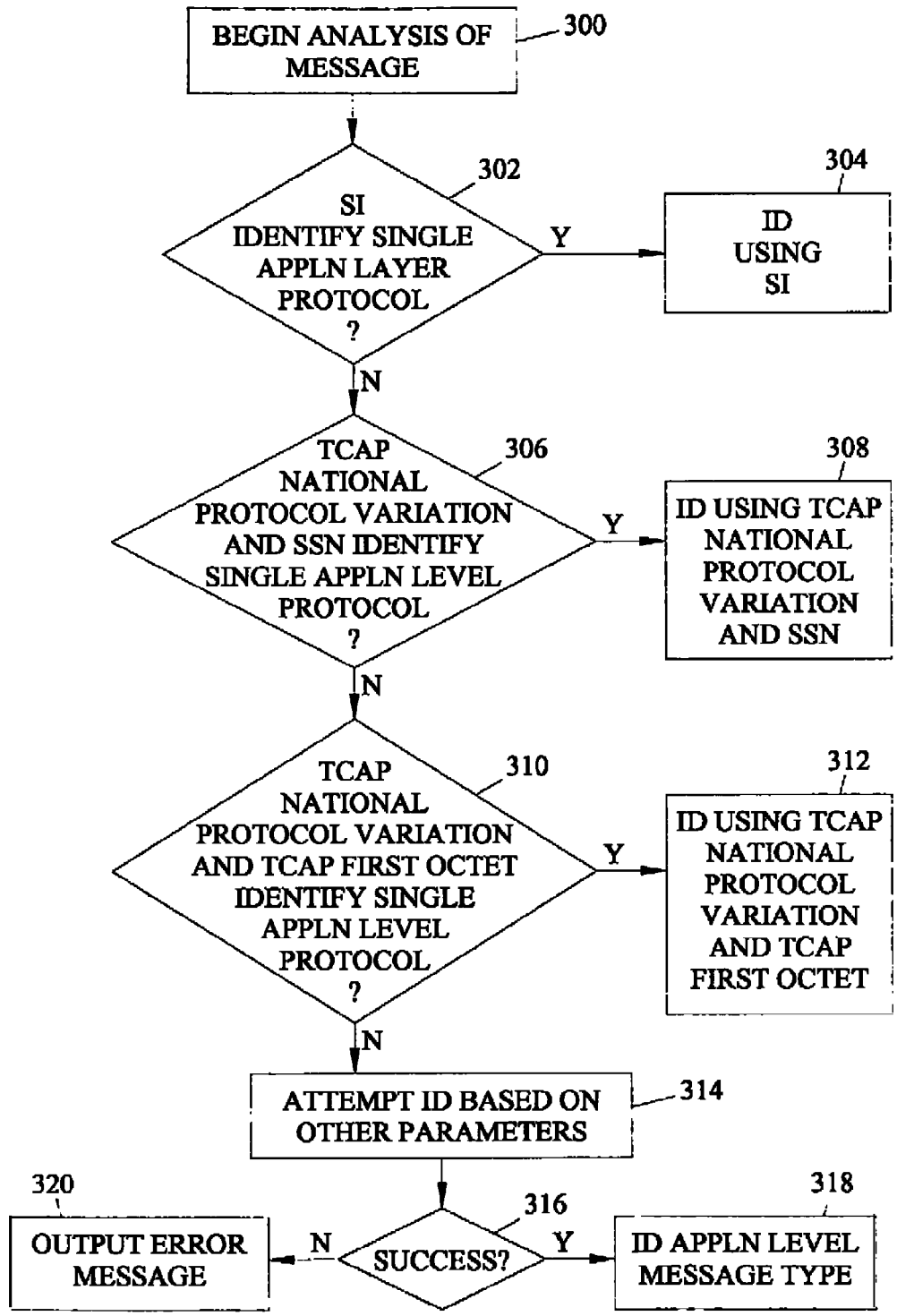
FIG. 3 is a flow chart illustrating an exemplary over-all method for identifying the application-level protocol of a signaling message according to an embodiment of the subject matter described herein.

FIG. 3 is a flow chart illustrating exemplary over-all steps for identifying the application-level protocol of a message. Referring to FIG. 3, in step 300, analysis of a message begins. In step 302, the service indicator of the message is examined to determine whether the service indicator indicates a single application-level protocol. If the service indicator indicates a single application-level protocol, control proceeds to step 304 where the application-level protocol is identified using the service indicator. Using the data in Table 1 as example, if the SI=5, the only application-level protocol associated with SI=5 is ISUP. Accordingly, the service indicator may be sufficient to identify ISUP messages.

In step 302, if the service indicator does not indicate a single application layer protocol, control proceeds to step 306 where the TCAP national protocol variation and the subsystem number are examined to determine if this combination of parameters identifies a single application-level protocol. If the TCAP national protocol variation and the subsystem number identify a single application-level protocol, control proceeds to step 308 where the application-level protocol is identified using the TCAP national protocol variation and the subsystem number. Referring to Table 1, if the TCAP national protocol variation is ANSI and the subsystem number is any one of 5-12, the application-level protocol is IS-41.

If the TCAP national protocol variation and the subsystem number fail to identify a single application-level protocol, control proceeds to step 310 where it is determined whether the TCAP national protocol variation and the TCAP first octet are examined to determine whether the TCAP national protocol variation and the TCAP first octet identify a single application-level protocol. The TCAP first octet, as used herein, refers to either the first octet in the first TCAP parameter tag and/or the first octet in the second TCAP parameter tag, as will now be explained in detail. For example, all LIDB messages are known to have 0xDF as the first octet of the first parameter tag. However, some application level protocols other than LIDB may use 0xDF as the first octet of the first parameter tag. Accordingly, accuracy in identifying the application level protocol can further be enhanced by examining the second octet of the first parameter tag in the TCAP message. As indicated in the attached source code appendix, if the first octet of the first TCAP parameter tag is 0xDF and the second octet of the first TCAP parameter tag is 0x46, the message may be assumed to be N00. If the first octet of the first TCAP parameter tag is 0xDF and the second octet of the first TCAP parameter tag is 0x81, the message may be assumed to be ANSI-41. Otherwise, if the first octet of the first TCAP parameter tag in the TCAP message is 0xDF and the message does not fall into one of the exceptions mentioned above, the message may be identified as a LIDB message.

As further indicated in the attached source code appendix, if the first octet of the first TCAP parameter tag is 0xAA, it may be necessary to analyze the first octet of the second TCAP parameter tag. If the first octet of the first parameter tag is 0xAA and the first octet of the second TCAP parameter tag is 0x8D, the application level protocol may be identified as CLASS. If the first octet of the first parameter tag is 0xAA and the first octet of the second parameter tag is 0x84, the application level protocol may be identified as N00. If the first octet of the first parameter tag is 0xAA and the first octet of the second parameter tag other than 0x8d and 0x84, the application level protocol may be assumed to be CLASS.

If the TCAP national protocol variation and the TCAP first octet indicate a single application-level protocol, control proceeds to step 312 where the application-level protocol is identified using the TCAP national protocol variation and the TCAP first octet. Using the data in Table 1 as an example, if the TCAP national protocol variation is ANSI, the SI is 3, and the first parameter has a value of 0xDF, the message may be assumed to be a LIDB message, provided that it does not fall into one of the exceptions mentioned in the preceding paragraph.

If the TCAP national protocol variation and the TCAP parameter fail to identify a single application-level protocol, control proceeds to step 314 where identification is attempted based on other parameters. Attempting identification based on other parameters may include comparing one or more point codes in the message to a table of provisioned point codes to identify the application-level protocol based on where the message is addressed. In step 316, it is determined whether the method for identifying the application-level protocol is successful. If the method is successful, control proceeds to step 318 where the application-level protocol is identified. If the attempt is not successful, control proceeds to step 320 where an error message is output to the operator indicating that the application-level protocol could not be positively identified.

Figure 4A:
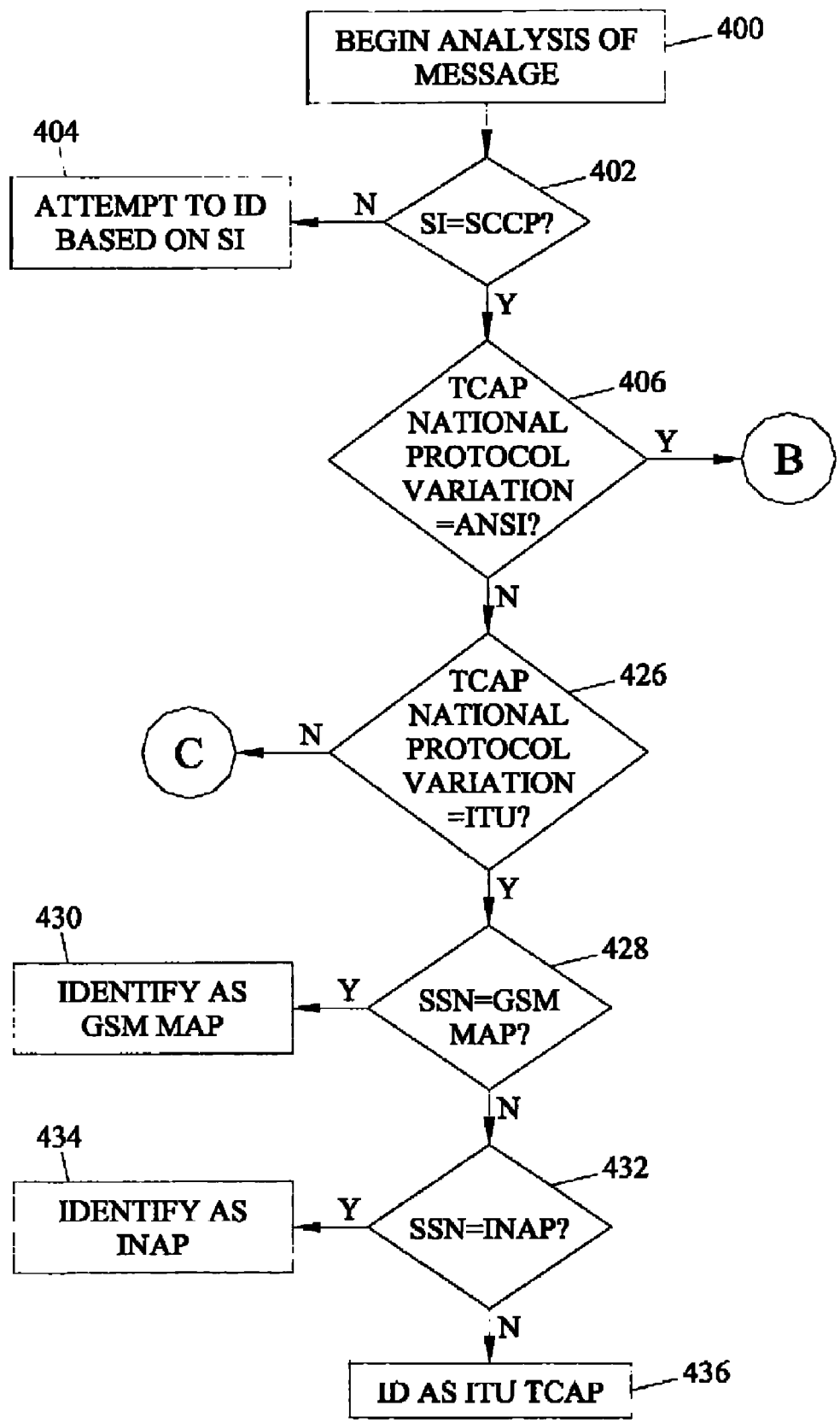
FIGS. 4A-4C are a flow chart illustrating an exemplary method for identifying the application-level protocol of a signaling message in more detail than the example illustrated in FIG. 3.
Figure 4B:
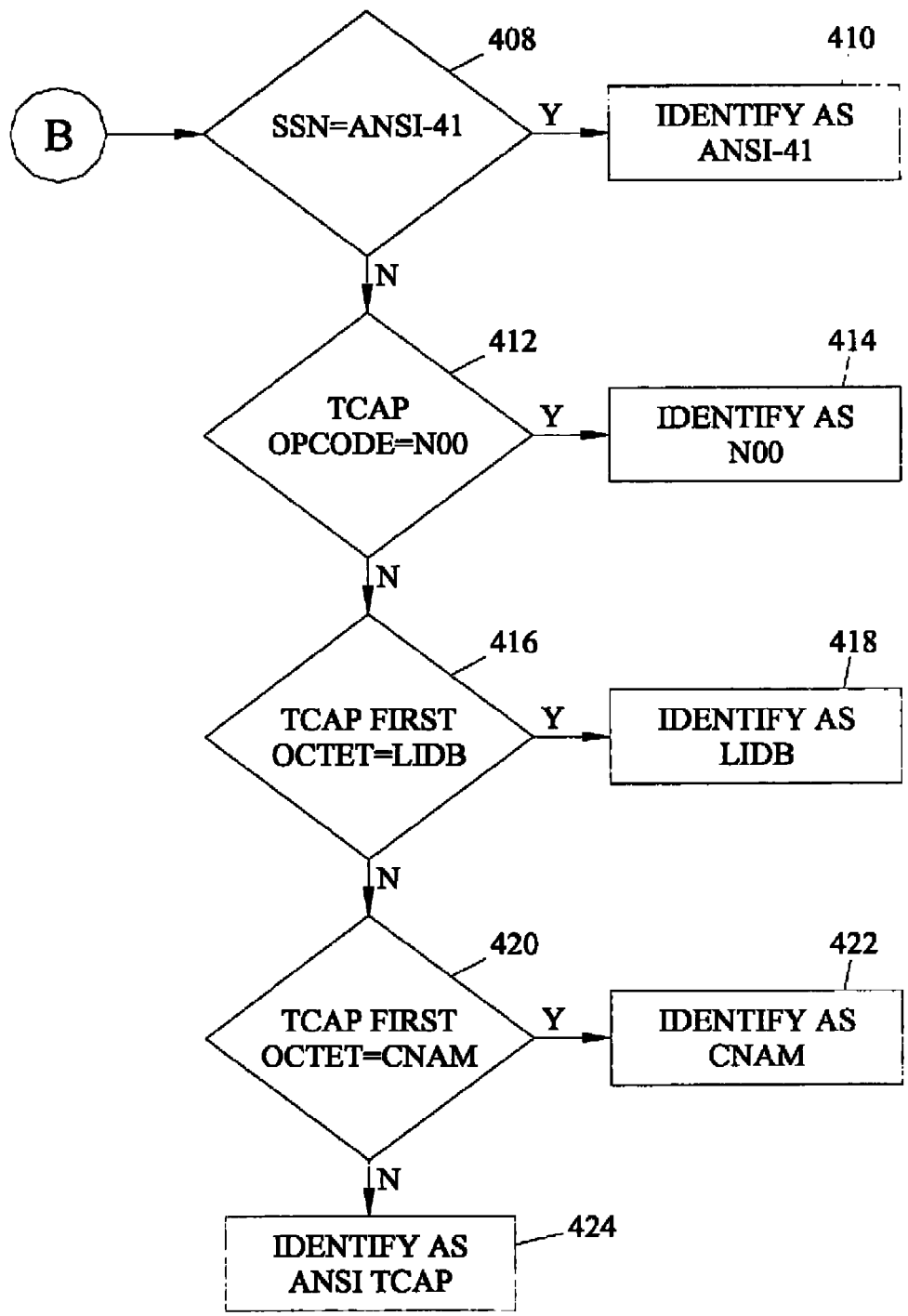
Figure 4C:
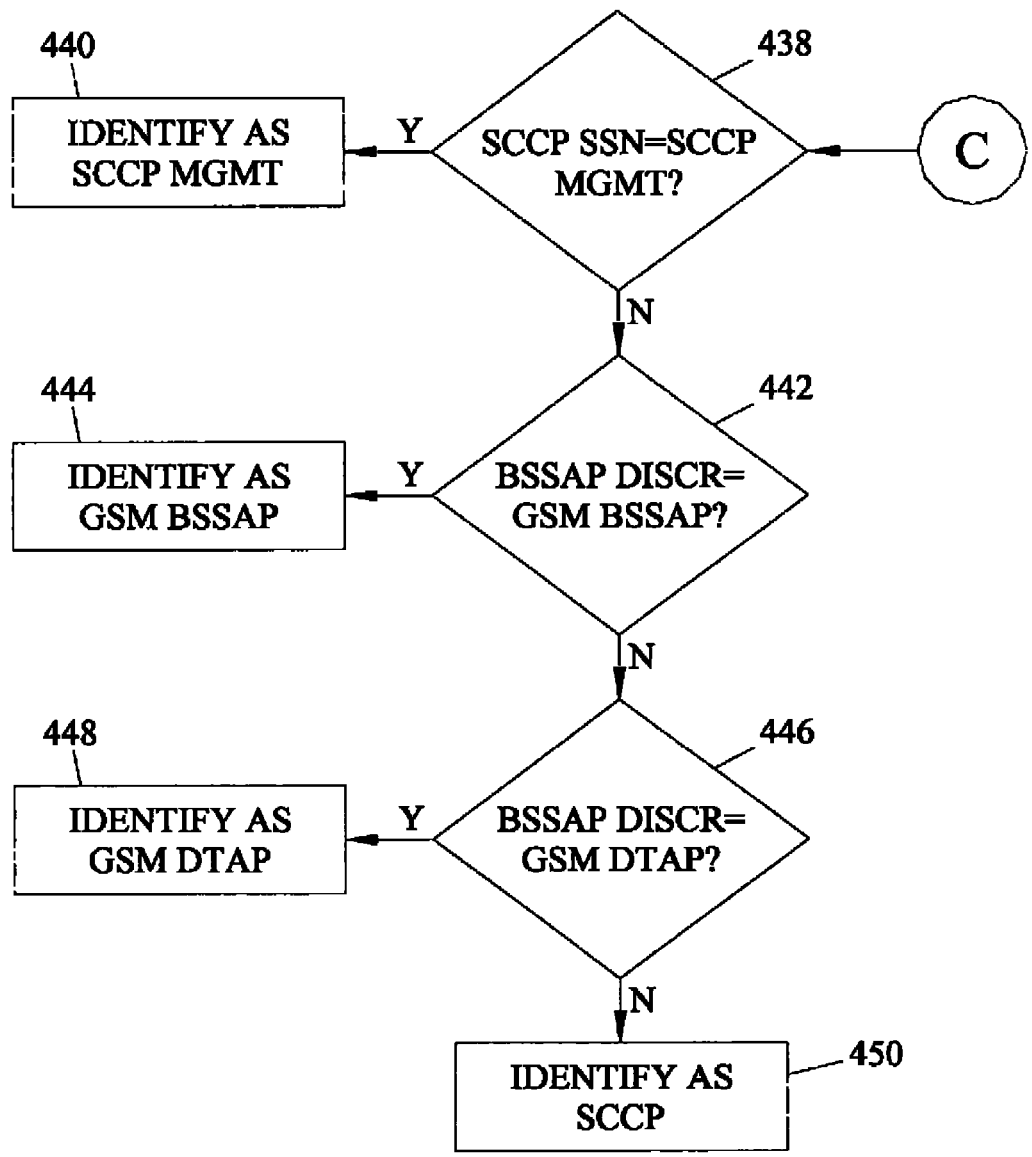

FIGS. 4A-4C are a flow chart illustrating detailed steps for identifying the application-level protocol of a signaling message according to an embodiment of the subject matter described herein. Referring to FIG. 4A, in step 400, analysis of a message is initiated. In step 402, it is determined whether the service indicator in the message indicates that the message is an SCCP message. If the service indicator does not indicate that the message is an SCCP message, then the application-level protocol can be identified based on the service indicator. Accordingly, control proceeds to step 404 where the application-level protocol is attempted to be identified based on the service indicator.

In step 402, if it is determined that the SI value indicates an SCCP message, further decoding may be required. In step 406, it is determined whether the TCAP national protocol variation indicates that the message is an ANSI message. If the TCAP national protocol variation indicates that the message is ANSI message, control proceeds to step 408 in FIG. 4B where it is determined whether the subsystem number indicates an ANSI-41 message. If the subsystem number indicates an ANSI-41 message, control proceeds to step 410 where the application-level protocol is identified as ANSI-41.

In step 408, if it is determined that the subsystem does not indicate ANSI-41, control proceeds to step 412 where it is determined whether the TCAP opcode indicates a toll free or N00 query. If the TCAP opcode indicates a toll free or N00 query, control proceeds to step 414 where the application-level protocol is indicated as N00.

In step 412, if the TCAP opcode does not indicate N00, control proceeds to step 416 where the first octet in the TCAP message is analyzed to determine whether the first octet includes a value common to line information database (LIDB) message. If the TCAP first octet indicates a LIDB message, control proceeds to step 418 where the application-level protocol is identified as LIDB.

In step 416, if the TCAP first octet does not indicate LIDB, control proceeds to step 420 where it is determined whether the TCAP first octet includes a value common to calling name (CNAM) messages. If the TCAP first octet indicates a CNAM message, control proceeds to step 422 where the application-level protocol is identified as CNAM.

In step 420, if the TCAP first octet does not indicate CNAM, control proceeds to step 424 where the message is identified as an ANSI TCAP message. The application-level protocol is not identified. In this case, the message may be decoded using a default template for decoding ANSI TCAP messages. Alternatively, as described above, the called party or the originating point code of the message may be examined and compared to a list of known point codes to identify the application protocol of the message.

Returning to step 406, if the TCAP national protocol variation is not ANSI, control proceeds to step 408 where it is determined whether the TCAP national protocol variation indicates international telecommunications union (ITU). If the TCAP national protocol variation indicates ITU, control proceeds to step 428 where it is determined whether the subsystem number indicates a GSM mobile application part (MAP) message. If the subsystem number indicates a GSM MAP message, control proceeds to step 430 where the application-level protocol is identified as GSM MAP.

In step 428, if the SSN does not indicate GSM MAP, control proceeds to step 430 where it is determined whether the SSN indicates an intelligent network application part (INAP) message. If the SSN indicates an INAP message, control proceeds to step 432 where the application-level protocol is identified as INAP.

In step 430, if the SSN does not indicate an INAP message, control proceeds to step 432 where the message is identified as ITU TCAP message by default. It should be noted that the application-level protocol is not identified. The message may be decoded using an ITU TCAP message decode template and the user may attempt to identify the application-level protocol. Alternatively, the application-level protocol may be identified by examining a point code in the message and comparing the point code to a list of provisioned point codes.

In step 426, if the TCAP national protocol variation is not ITU, control proceeds to the steps illustrated in FIG. 4C. Referring to FIG. 4C, in step 436, it is determined whether the subsystem number indicates that the message is an SCCP management message. If the subsystem number indicates an SCCP management message, control proceeds to step 438 where the application-level protocol is identified as SCCP management.

In step 436, if the subsystem number does not indicate an SCCP management message, control proceeds to step 440 where it is determined whether the base station subsystem application part (BSSAP) discriminator indicates a GSM BSSAP message. If the BSSAP discriminator indicates a GSM BSSAP message, control proceeds to step 442 where the message is identified as a GSM BSSAP message.

In step 440, if the BSSAP discriminator does not indicate a GSM BSSAP message, control proceeds to step 442 where it is determined whether the BSSAP discriminator indicates a GSM DTAP message. If the BSSAP discriminator indicates a GSM DTAP message, control proceeds to step 446 where the application-level protocol is identified as GSM DTAP.

In step 444, if the BSSAP discriminator is not equal to GSM DTAP, control proceeds to step 448 where the message is identified as an SCCP message. It should be noted that the application-level protocol is not identified. In this instance, one or more point codes can be compared to a list of point codes to identify the destination application. The application-level protocol may then be determined based on the destination application.

The following computer source code illustrates an exemplary algorithm for identifying the application-level protocol of a message. The source code is written in a procedural programming language with IF-ELSE constructs. It is understood that algorithm illustrated by the attached source code can be implemented in any procedural or object-oriented programming language without departing from the scope of the subject matter described herein.

```
PARAM PROTOCOL    IF (SI == 0x5)
                  {
                         RETURNVALUE 0x500        # ISUP
                  }
                  ELSE IF ( == 0x3)        # SCCP
                  {
                      IF ( TCAP_FLAVOR == 0x7)
                      {
                         # ANSI TCAP
                         IF ( (SCCP_SSN == 5)||
                              ( == 6)        ||
                              ( == 7)        ||
                              ( == 8)        ||
                              ( == 9)        ||
                              ( == 10)       ||
                              ( == 11))
                         {
                              RETURNVALUE 0x321        # ANSI-41
                         }
                         ELSE IF ((TCAP_OPER == 0x0183) ||
                              ( == 0x0104)        ||
                              ( == 0x0105))
                         {
                              RETURNVALUE 0x323        # N00
                         }
                         ELSE IF (ANSI_TCAP_1ST_OCTET)
                         {
                             IF ( == 0x97)
                             {
                             RETURNVALUE 0x324 # CNAM
                             }
                             ELSE IF ( == 0xdf)
                             {
                                RETURNVALUE 0x325 # LIDB
                             }
                             ELSE
                             {
                                RETURNVALUE 0x320#ANSI TCAP
                             }
                         }
                         ELSE
                         {
                              RETURNVALUE 0x320 # ANSI TCAP
                         }
                      }
                      ELSE IF ( == 0x3)
                      {
                         # ITU TCAP
                         IF ((SCCP_SSN == 5)        ||
                              ( == 6)        ||
                              ( == 7)        ||
                              ( == 8)        ||
                              ( == 9)        ||
                              ( == 10) )
                         {
                              RETURNVALUE 0x331        # GSM MAP
                         }
                         ELSE IF (SCCP_SSN == 0xf1)
                         {
                              RETURNVALUE 0x332        # INAP
                         }
                         ELSE
```

| | | |
|---|---|---|
| | -continued | |

```
            {
                    RETURNVALUE 0x330        # ITU TCAP
            }
        }
        ELSE IF (SCCP_SSN == 1)
        {
                RETURNVALUE 0x310            # SCCP MGMT
        }
        ELSE IF (BSSAP_DISCR == 0)
        {
                RETURNVALUE 0x340            # GSM BSSMAP
        }
        ELSE if (BSSAP_DISCR == 1)
        {
                    RETURNVALUE 0x350        # GSM DTAP
            }
            ELSE
            {
                    RETURNVALUE 0x300        # SCCP
            }
        }
        ELSE IF ( == 0x4)
        {
            RETURNVALUE 0x400                # TUP
        }
        ELSE IF ( == 0x0)
        {
            RETURNVALUE 0x000                # SIGNET
        }
        ELSE IF ( == 0x1)
        {
            RETURNVALUE 0x100                # NETTSTREG
        }
        ELSE IF ( == 0x2)
        {
            RETURNVALUE 0x200                # NETTSTSPEC
        }
        ELSE IF ( == 0xd)
        {
            RETURNVALUE 0xd00                # BICC
        }
        ELSE IF ( == 0x6)
        {
            RETURNVALUE 0x600                # DUP6
        }
        ELSE IF ( == 0x7)
        {
            RETURNVALUE 0x700                # DUP7
        }
        ELSE IF ( == 0x9)
        {
            RETURNVALUE 0x900                # BISUP
        }
        ELSE IF ( == 0xa)
        {
            RETURNVALUE 0xa00                # SISUP
        }
        ELSE
        {
            RETURNVALUE 0xf00                # Invalid SI
        }
DISPLAY PROTOCOL        Hex
```

Thus, from FIGS. 3 and 4A-4C and the source code example above, one exemplary procedure for determining the application-level protocol of a signaling message is process where parameters or groups of parameters beyond the SI are individually tested to determine the application-level protocol. If the application-level protocol can be determined based on a specific attribute, the application-level protocol is determined based on that attribute. If the application-level protocol cannot be determined based on an attribute, the next attribute is tested. If the application-level protocol of the message cannot be identified using the aforementioned steps, the method may revert to using translation type, SSN, and/or a table of point codes to identify the application-level protocol.

Although the examples described above relate primarily to identifying the application level protocol of SS7 MSUs, the subject matter described herein may also identify the application, network, transport, and signaling adaptation protocols of other types of messages. For example, in the computer program source code appendix incorporated herein, instructions for identifying IP, TCP/IP, UDP/IP, SIP, M3UA, SCTP and TALI protocols are provided. The source code in the attached appendix may be implemented by application-level protocol identifiers 134 described above. Providing instructions for identifying these IP-based protocols allows network monitoring and data collection systems to operate in IP telephony signaling networks.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for determining an application-level protocol of a signaling message, the method comprising:
    at a site collector including at least one application embodied in a non-transitory computer readable medium for:
    (a) receiving a signaling message copied by a network monitoring system;
    (b) examining a service indicator of a message signaling unit (MSU) in the signaling message;
    (c) determining, based on the service indicator, whether more than one application-level protocol for the signaling message is possible;
    (d) in response to determining that the service indicator does not indicate that more than one application-level protocol is possible, identifying the application-level protocol based on the service indicator; and
    (e) in response to determining that the service indicator indicates that more than one application-level protocol is possible:
        (i) individually examining at least one additional attribute or group of attributes of the signaling message, wherein the at least one additional attribute or group of attributes of the signaling message to be examined is selected based on distinguishing features of application-level protocols;
        (ii) determining whether the application-level protocol is identifiable based on the at least one additional attribute or group of attributes;
        (iii) in response to determining that the application-level protocol is identifiable based on the additional attribute or group of attributes, identifying the application-level protocol; and
        (iv) in response to determining that the application-level protocol is not identifiable based on the additional attribute or group of attributes, selecting another attribute or group of attributes and repeating steps (e)(i)-(e)(iv) for the selected attribute or group of attributes.

2. The method of claim 1 wherein the at least one additional attribute or group of attributes includes a transaction capabilities application part (TCAP) national protocol variation and a subsystem number (SSN).

3. The method of claim 2 wherein, in response to determining that the application-level protocol is not identifiable based on the TCAP national protocol variation and the SSN, the selected attribute or group of attributes in step (e)(iv) includes a TCAP opcode.

4. The method of claim 3 wherein, in response to determining that the application-level protocol is not identifiable based on the TCAP opcode, the selected attribute or group of attributes in step (e)(iv) includes a TCAP first octet.

5. The method of claim 2 wherein, in response to determining that the application-level protocol is not identifiable based on the TCAP national protocol variation and the SSN, the selected attribute or group of attributes in step (e)(iv) includes a base station subsystem application part (BSSAP) discriminator.

6. The method of claim 1 comprising, in response to failing to identify the application-level protocol of the message, determining that the message does not have an application-level protocol and wherein the method further comprises decoding the message using a default message decode template.

7. A method for identifying the application-level protocol of a signaling message, the method comprising:
    at a site collector including at least one application embodied in a non-transitory computer readable medium for:
    (a) receiving a signaling message copied by a network monitoring system;
    (b) determining whether a service indicator (SI) parameter of a message signaling unit (MSU) in the signaling message indicates that the message is a signaling connection control part (SCCP) message;
    (c) in response to determining that the SI indicates that the message is an SCCP message, examining a transaction capabilities application part (TCAP) national protocol variation and a subsystem number (SSN) of the message;
    (d) determining whether the TCAP national protocol variation and the SSN indicate the application-level protocol of the message;
    (e) in response to determining that the TCAP national protocol variation and the SSN indicate the application-level protocol of the message, identifying the application-level protocol; and
    (f) in response to determining that the TCAP national protocol variation and the SSN do not identify the application-level protocol, determining the application-level protocol by individually examining at least one additional parameter in the signaling message, wherein the at least one additional parameter in the signaling message to be examined is selected based on distinguishing features of application-level protocols.

8. The method of claim 7 wherein the at least one additional parameter includes a TCAP opcode.

9. The method of claim 7 wherein the at least one additional parameter includes a TCAP first octet.

10. The method of claim 7 wherein the at least one additional parameter includes a base station subsystem application part discriminator.

11. A method for identifying the application level protocol of a transaction capabilities application part (TCAP) message, the method comprising:
    at a site collector including at least one application embodied in a non-transitory computer readable medium for:
    (a) receiving a signaling message copied by a network monitoring system, examining a service indicator of a message signaling unit (MSU) in the signaling message, determining, based on the service indicator, that the signaling message is a signaling connection control part (SCCP) message that includes a TCAP message, and analyzing a first octet of a first parameter tag of the TCAP message copied by the network monitoring system;
    (b) determining whether the first octet of the first parameter tag identifies a plurality of application level protocols possible for the TCAP message; and
    (c) in response to determining that the first octet of the first parameter tag identifies a plurality of application level protocols possible for the TCAP message, identifying the application level protocol of the TCAP message using at least one additional octet in a TCAP parameter tag of the TCAP message, wherein the at least one additional octet to be examined is selected based on distinguishing features of application-level protocols.

12. The method of claim 11 wherein identifying the application level protocol using at least one additional octet includes identifying the application level protocol using a second octet of the first TCAP parameter tag.

13. The method of claim 11 wherein identifying the application level protocol using at least one additional octet includes identifying the application level protocol using a first octet of a second TCAP parameter tag.

14. A system for identifying the application-level protocol of a signaling message, the system comprising:
(a) a message copy function for copying telecommunications signaling messages;
(b) a message database for storing the message copies; and
(c) an application-level protocol identifier for examining a message in the message database, determining whether a service indicator of a message signaling unit (MSU) in the message indicates that more than one application-level protocol for the signaling message is possible, and, in response to determining that more than one application-level protocol is possible, for individually examining at least one additional attribute of the signaling message and attempting to identify the application level protocol based on the at least one additional attribute, wherein the at least one additional attribute of the signaling message to be examined is selected based on distinguishing features of application-level protocols.

15. The system of claim 14 comprising a link monitoring probe and wherein the message copy function is associated with the link monitoring probe.

16. The system of claim 14 comprising a signaling node and wherein the message copy function is associated with the signaling node.

17. The system of claim 14 wherein the at least one additional attribute includes a transaction capabilities application part (TCAP) national variation and a subsystem number (SSN).

18. The system of claim 17 wherein, in response to failing to identify the application-level protocol based on the TCAP national variation and the SSN, the application-level protocol identifier attempts to identify the application-level protocol based on the TCAP opcode.

19. The system of claim 18 wherein, in response to failing to identify the application-level protocol based on the TCAP opcode, the application-level protocol identifier attempts to identify the application-level protocol based on a TCAP first octet.

20. The system of claim 19 wherein, in response to failing to identify the application-level protocol based on the TCAP first octet, the application-level protocol identifier identifies the message as a message of the TCAP national protocol variation.

21. The system of claim 17 wherein, in response to failing to identify the application-level protocol of the message based on the TCAP national protocol variation and the SSN, the application-level protocol identifier attempts to identify the application-level protocol of the signaling message based on a base station subsystem application part (BSSAP) discriminator.

22. The system of claim 14 wherein, in response to failing to identify the application-level protocol of the signaling message, the application-level protocol identifier examines a point code in the signaling message and to identify the application-level protocol based on an application associated with the point code.

23. The system of claim 22 wherein the message includes a TCAP return error message.

24. The system of claim 14 wherein the application-level protocol identifier identifies the application-level protocol of a response message by identifying the application level protocol of a query message and pairing the query message with the response message.

25. The system of claim 14 wherein the application-level protocol identifier identifies at least one of network, transport, signaling adaptation, and application level protocols of IP-based signaling messages.

26. The system of claim 22 wherein the application-level protocol identifier identifies at least one of IP, TCP/IP, UDP/IP, SCTP/IP, M3UA, TALI, and SIP protocols of the IP-based signaling messages.

27. A computer program product comprising computer-executable instructions embodied in a non-transitory computer readable medium for performing steps comprising:
(a) receiving a signaling message copied by a network monitoring system;
(b) examining a service indicator of a message signaling unit (MSU) in the signaling message;
(c) determining, based on the service indicator, whether more than one application-level protocol for the signaling message is possible;
(d) in response to determining that the service indicator does not indicate that more than one application-level protocol is possible, identifying the application-level protocol based on the service indicator; and
(e) in response to determining that the service indicator indicates that more than one application-level protocol is possible:
(i) individually examining at least one additional attribute or group of attributes of the signaling message, wherein the at least one additional attribute or group of attributes of the signaling message to be examined is selected based on distinguishing features of application-level protocols;
(ii) determining whether the application-level protocol is identifiable based on the at least one additional attribute or group of attributes;
(iii) in response to determining that the application-level protocol is identifiable based on the additional attribute or group of attributes, identifying the application-level protocol; and
(iv) in response to determining that the application-level protocol is not identifiable based on the additional attribute or group of attributes, selecting another attribute or group of attributes and repeating steps (e)(i)-(e)(iv) for the selected attribute or group of attributes.

28. The computer program product of claim 27 wherein the at least one additional attribute or group of attributes includes a transaction capabilities application part (TCAP) national protocol variation and a subsystem number (SSN).

29. The computer program product of claim 28 wherein, in response to determining that the application-level protocol is not identifiable based on the TCAP national protocol variation and the SSN, the selected attribute or group of attributes in step (e)(iv) includes a TCAP opcode.

30. The computer program product of claim 29 wherein, in response to determining that the application-level protocol is not identifiable based on the TCAP opcode, the selected attribute or group of attributes in step (e)(iv) includes a TCAP first octet.

31. The computer program product of claim 28 wherein, in response to determining that the application-level protocol is not identifiable based on the TCAP national protocol variation and the SSN, the selected attribute or group of attributes in step (e)(iv) includes a base station subsystem application part (BSSAP) discriminator.

32. The computer program product of claim 27 comprising, in response to failing to identify the application-level protocol of the message, determining that the message does not have an application-level protocol and wherein the computer program product further comprises decoding the message using a default message decode template.

33. A computer program product comprising computer-executable instructions embodied in a non-transitory computer readable medium for identifying the application-level protocol of a signaling message, the method computer program product performing steps comprising:
 (a) receiving a signaling message copied by a network monitoring system;
 (b) determining whether a service indicator (SI) parameter of a message signaling unit (MSU) in the signaling message indicates that the message is a signaling connection control part (SCCP) message;
 (c) in response to determining that the SI indicates that the message is an SCCP message, examining a transaction capabilities application part (TCAP) national protocol variation and a subsystem number (SSN) of the message;
 (d) determining whether the TCAP national protocol variation and the SSN indicate the application-level protocol of the message;
 (e) in response to determining that the TCAP national protocol variation and the SSN indicate the application-level protocol of the message, identifying the application-level protocol; and
 (f) in response to determining that the TCAP national protocol variation and the SSN do not identify the application-level protocol for the message, determining the application-level protocol by individually examining at least one additional parameter in the signaling message, wherein the at least one additional parameter in the signaling message to be examined is selected based on distinguishing features of application-level protocols.

34. The computer program product of claim 33 wherein the at least one additional parameter includes a TCAP opcode.

35. The computer program product of claim 33 wherein the at least one additional parameter includes a TCAP first octet.

36. The computer program product of claim 33 wherein the at least one additional parameter includes a base station subsystem application part discriminator.

* * * * *